(12) United States Patent
Hodnik et al.

(10) Patent No.: US 10,544,481 B2
(45) Date of Patent: Jan. 28, 2020

(54) METHOD FOR THE RECOVERY OF PRECIOUS METAL

(71) Applicant: Max-Planck-Institut für Eisenforschung GmbH, Düsseldorf (DE)

(72) Inventors: Nejc Hodnik, Ljubljana (SI); Claudio Baldizzone, Düsseldorf (DE); Karl Mayrhofer, Düsseldorf (DE)

(73) Assignee: Max-Planck-Institut für Eisenforschung GmbH, Düsseldorf (DE)

( * ) Notice: Subject to any disclaimer, the term of this patent is extended or adjusted under 35 U.S.C. 154(b) by 0 days.

(21) Appl. No.: 15/771,500

(22) PCT Filed: Oct. 25, 2016

(86) PCT No.: PCT/DE2016/100498
§ 371 (c)(1),
(2) Date: Apr. 27, 2018

(87) PCT Pub. No.: WO2017/071685
PCT Pub. Date: May 4, 2017

(65) Prior Publication Data
US 2018/0347008 A1    Dec. 6, 2018

(30) Foreign Application Priority Data
Oct. 27, 2015    (DE) .......................... 10 2015 117 279

(51) Int. Cl.
*C22B 3/00*    (2006.01)

(52) U.S. Cl.
CPC .................. *C22B 11/048* (2013.01)

(58) Field of Classification Search
CPC ................................................. C22B 11/048
See application file for complete search history.

(56) References Cited

U.S. PATENT DOCUMENTS 3,034,893 A * 5/1962 Bruenner ............... G03C 5/44
423/658.5
3,985,854 A 10/1976 Bradford et al.
(Continued)

FOREIGN PATENT DOCUMENTS

| DE | 207 555 | 9/1908 |
| DE | 25 25 829 | 1/1976 |
| EP | 2 824 201 | 1/2015 |

OTHER PUBLICATIONS

Manis Kumar Jha, et al: "Hydrometallurgical recovery/recycling of platinum by the leaching of spent catalysts: A review"; Hydrometallurgy 133 (Feb. 1, 2013), pp. 23-32 (XP055296220).
(Continued)

*Primary Examiner* — Melissa S Swain
(74) *Attorney, Agent, or Firm* — Gudrun E. Huckett

(57) ABSTRACT

The invention relates to a method for the recovery of precious metal from materials containing precious metal, said method comprises the following steps of: A) bringing the materials containing the precious metal into contact with an oxidizing agent, B) bringing the material containing the precious metal into contact with a reducing agent. Said method offers the possibility of recovering precious metal in a simple manner and in high purity from secondary materials.

9 Claims, 2 Drawing Sheets

(56) References Cited

U.S. PATENT DOCUMENTS

| | | | |
|---|---|---|---|
| 4,585,628 A * | 4/1986 | Fischer, Jr. ......... | C01G 31/003 423/150.2 |
| 4,913,730 A | 4/1990 | Deschenes et al. | |
| 5,223,023 A | 6/1993 | Awadalla et al. | |

OTHER PUBLICATIONS

De Sa Pinheiro, et al: "Recovery of platinum from spent catalysts in a fluoride-containing medium"; Hydrometallurgy 74 (Aug. 1, 2004), pp. 77-84 (XP004513065).

Juchniewicz, R.: "The Influence of Alternating Current on the Anodic Behaviour of Platinum"; Platinum Metals Review, vol. 6 (3), pp. 100-105 (1962).

\* cited by examiner

METHOD FOR THE RECOVERY OF PRECIOUS METAL

BACKGROUND OF THE INVENTION

The present invention relates to a process for isolating noble metals from noble metal-containing materials.

Noble metals are metals which are particularly corrosion-resistant. They include in particular gold and silver, but also the platinum metals. Gold and silver have been used for producing jewelry and coins since antiquity because of their corrosion resistance. The metals platinum, palladium and rhodium, in particular, are frequently present in automobile catalysts. Further fields of use of noble metals are electric and electronic appliances, e.g. circuit boards, chips, anodes and cathodes and also sputtering targets, and also fuel cells.

Noble metals are among the most valuable raw materials, for which reason the recovery of these raw materials from used materials has been carried out for many years. Noble metal recycling itself is a valuable material circuit, but it is difficult to separate the noble metals from the products into which they have been incorporated. There are various types of recycling: for example alloys can be treated as fusible scrap. The elements to be recovered are processed in a melting furnace to give granules or ingots and are subsequently recovered in high purity by silver processes and/or electrolysis or wet-chemical processes. One possible way of recovering noble metal from used materials which cannot be recovered by melting is natural separation. The noble metals are recovered in pure form by means of classical separation such as precipitation, filtering or washing.

In addition, a process in which dross is used as starting material is known for noble metal recovery. This means that the used materials consist mainly of organic materials such as paper or plastic and contain small amounts of noble metals. The materials are burnt in a furnace and the metal-containing ash obtained is upgraded via a melting process or wet-chemical purification.

In automobile catalysts and other exhaust gas purification catalysts, noble metals are likewise used as catalyst metals. The catalysts are usually coated with a noble metal, with the metals platinum, palladium and rhodium being most frequently used because of their catalytic properties. The recovery of the noble metals from the catalyst is generally carried out by firstly separating the catalysts from the housing. The catalyst ceramic is subsequently milled to a powder and the catalyst powder obtained is reprocessed in a manner known per se in a separation facility.

Owing to their economic value, efforts are made to recover noble metals as completely as possible from waste materials, also referred to as used materials or materials of value. The processes known from the prior art are costly and generally comprise a plurality of working steps. In addition, the recovery of noble metals is generally carried out using aqua regia, namely a very aggressive mixture of concentrated hydrochloric acid and concentrated nitric acid which contains nascent chlorine and nitrosyl chloride. This component is both toxic and highly corrosive and promotes fires, so that the use of aqua regia requires strict safety measures.

It was therefore an object of the present invention to provide a process for isolating noble metals, by means of which the noble metals can be obtained in a simple way and in high purity.

SUMMARY OF THE INVENTION

The present invention accordingly provides a process for isolating noble metals from noble metal-containing materials, which comprises the steps A) contacting of the noble metal-containing used materials with an oxidizing agent, B) contacting of the reaction product from step A with a reducing agent.

The process of the invention makes it possible to recover noble metals from noble metal-containing materials in a simple way. Both process steps A and B can be carried out in the same apparatus. Examples of noble metal-containing materials are used materials, also referred to as use products or materials of value, or ores and other materials containing noble metals. Used materials which can be employed include many waste products, electronic waste products, circuit boards, chips, electronic contacts or contact rivets, waste from plant contact manufacturers and electroplating operations or assemblers as reject product, anodes, cathodes or sputtering targets, dental products, noble metal-containing dross, residues from electrolytic baths, e.g. from electrolyte filters, resins, sludges, baths, electrolytes and anode residues, automobile catalysts, fuel cells and also noble metal-containing paint residues including gold and silver pastes, silver solders, cleaning cloths, etc. The used materials can be employed as such, i.e. without chemical or mechanical pretreatment. Depending on the form of the used materials, it is also possible to comminute or mill the materials employed in a suitable mill or another apparatus before carrying out the process.

A further advantage of the process of the invention is that the use of aqua regia can be dispensed with, as a result of which not only the use of this relatively costly material but also the requirements in terms of apparatus can be reduced. Since aqua regia is a very aggressive liquid which forms both nascent chlorine and nitrosyl chloride, its use is avoided for reasons of environmental protection and because of the hazards to the health of workers.

The process of the invention comprises cycles of an oxidation step and a reduction step, with it being possible to commence either with process step A or with process step B. Process step B, i.e. the reduction reaction, is selected as first process step particularly when the noble metals are present as oxides or in another oxidized form in the noble metal-containing materials. The noble metals frequently have a thin oxide layer which is removed in the reduction step. Process steps A and B are subsequently carried out. The cycles of the process steps A and B can be repeated as often as desired, preferably until no or virtually no noble metal is detectable in the material employed or until the content of recovered noble metal in the reaction solution no longer increases. It has been found to be advantageous to repeat the cycle of the steps A and B at least 3 times. In the case of the amounts and layer thicknesses of noble metals normally present in used materials, the noble metals can generally be recovered virtually completely from the used material using from 3 to 20 cycles. In the case of larger amounts or greater layer thicknesses, more than 20 cycles can optionally also be carried out.

The examination of the material to determine whether noble metals are still present can be carried out at regular intervals while the process is being carried out. Appropriate analysis can be carried out directly by use of spectroscopic methods or else by sampling and subsequent analysis.

The noble metals which can be isolated from the noble metal-containing materials by the process of the invention are preferably noble metals of the platinum group, in particular Pt, Pd, Rh, Au, Ru, Ir, Os and/or Ag.

To carry out the process of the invention, the noble metal-containing material is brought into contact with an oxidizing agent in process step A. Suitable oxidizing agents are any oxidizing agents known from the prior art, in particular $O_2$, $O_3$ (ozone), $H_2O_2$, $HClO_4$ or salts thereof, $HClO_3$ or salts thereof, alkali metal permanganate, alkali metal percarbonates, alkali metal persulfates and any mixtures of the above.

The process of the invention is usually carried out in an aqueous, optionally salt-containing, solution. Fast reaction times can be achieved in the presence of a strong acid or strong base. If the pH of the reaction mixture is in the strongly acidic range, it is preferably <4, in particular <3, and in the strongly basic range is preferably >10, in particular >11. The process of the invention can also be carried out at a weakly acidic, neutral or weakly basic pH, but in this case the reaction rate can become slower. It is noteworthy that the reaction rate in 0.1 M HCl is comparable to the reaction rate in aqua regia, although the pH thereof is significantly lower. As acids, it is possible to use HCl, $HClO_4$, $H_2SO_4$, $HNO_3$, aqua regia and any other inorganic acid, with preference being given to $HClO_4$ and HCl. Possible bases are, in particular, alkali metal hydroxides such as NaOH and KOH.

To carry out process step A, the oxidizing agent is introduced into the mixture of aqueous solution and noble metal-containing used material. The oxidizing agent can be used in pure form or in admixture with inert compounds which do not adversely affect the reaction. If a gaseous oxidizing agent is used, this can be introduced either as pure gas or in admixture with an inert gas such as $N_2$ or Ar.

The aqueous solution is preferably stirred during introduction of the oxidizing agent.

Process step A is preferably carried out in a temperature range from −21° C. to 150° C., in particular at room temperature.

In process step B, the reaction mixture is brought into contact with a reducing agent. The reducing agent is preferably liquid or gaseous, and in particular is selected from among $H_2S$, $SO_2$, $SO_3$, CO, $H_2$, methanol, ethanol and any mixtures of the above. The reducing agent can be used in pure form or in admixture with inert compounds which do not have an adverse effect on the reaction, for example with inert gases, e.g. $N_2$ or Ar or mixtures thereof. Process step B is preferably carried out in a temperature range from −21° C. to 150° C., in particular at room temperature.

In order to prevent an explosive mixture from being formed by contact of ozone still present from process step A and reducing agent from step B, it has been found to be preferable for the reaction mixture to be firstly flushed with an inert gas, for example with $N_2$ or Ar, before introduction of the reducing agent.

In a preferred embodiment of the present invention, the reaction in at least one process step is carried out in the presence of a complexing agent. It is also possible for both reaction steps to be carried out in the presence of a complexing agent. Suitable complexing agents are, in particular, halide- or pseudohalide-containing salts. Preference is given to using alkali metal halides or pseudohalides, in particular alkali metal chlorides, bromides, iodides or cyanides, cyanates or isocyanates. Particularly suitable examples are NaCl, KCl, NaBr, KBr, NaI, KI, NaCN, NaOCN, NaSCN, KCN, KOCN and/or KSCN. The complexing agents can be added to the aqueous solution in an amount of from $1 \times 10^{-5}$ mol/l up to the saturation concentration.

The inventors have established that the noble metal goes into solution during the respective process steps. The precise course of the reaction is not known up to now, but it is assumed that oxidizing or reducing agents such as CO and, if present, also the complexing agents complex the metal which has been oxidized or reduced in process step A or B and keep it in solution.

As mentioned above, the number of cycles of reduction and oxidation or oxidation and reduction is repeated until the content of noble metals in the reaction solution no longer increases. The noble metals are subsequently isolated in a manner known per se from the reaction solution and optionally passed to further processing or treatment steps. For further processing and isolation of the noble metal, the reaction solution containing the noble metal can be filtered off from the solids and the noble metal can be isolated chemically or electrochemically. It is also possible to precipitate the noble metal directly from the reaction solution in the presence of the residues of used materials by arranging an electrode in the solution and applying a voltage which corresponds to the electrochemical potential of the noble metal to be isolated from the solution, so that only this specific noble metal is deposited on the electrode.

DESCRIPTION OF PREFERRED EMBODIMENTS

EXAMPLES

Example 1

In a glass beaker provided with a magnetic stirrer bar, a solution was produced from 100 ml of 0.1 M $HClO_4$ and 10 µl of 1 M NaCl so as to give a solution having a chloride ion concentration of 0.1 M. 17.0128 µg Pt particles having a particle size of 3 nm on activated carbon having a large surface area (loading with metal 46%) were deposited on a smooth carbon surface. The carbon support was dipped into the solution and rotated at 400 rpm. The glass beaker had two inlets for gases.

Four different experiments were carried out in order to examine the influence of (i) reaction solution, (ii) ozone, (iii) exchange between ozone and hydrogen, (iv) exchange between ozone and CO and (v) exchange between ozone and CO in 0.1 M HCl as reaction solution.
  (i) stirring of the suspension in the presence of air for a period of 35 minutes
  (ii) stirring of the suspension in the presence of $O_3$ for a period of 35 minutes
  (iii) stirring of the suspension for five minutes in each of $O_3$, Ar, $O_2$, Ar, $O_3$, Ar, $H_2$, Ar
  (iv) stirring of the suspension for five minutes in each of $O_3$, Ar, Co, Ar, $O_3$, Ar, CO and Ar.

The results are shown in the following table.

|   | Reaction with | % of Pt |
|---|---|---|
| 1 |   | 0.51 |
| 2 | $O_3$ | 1.15 |
| 3 | $O_3/H_2$ | 6.26 |
| 4 | $O_3/CO$ | 49.83 |

Figure 1:
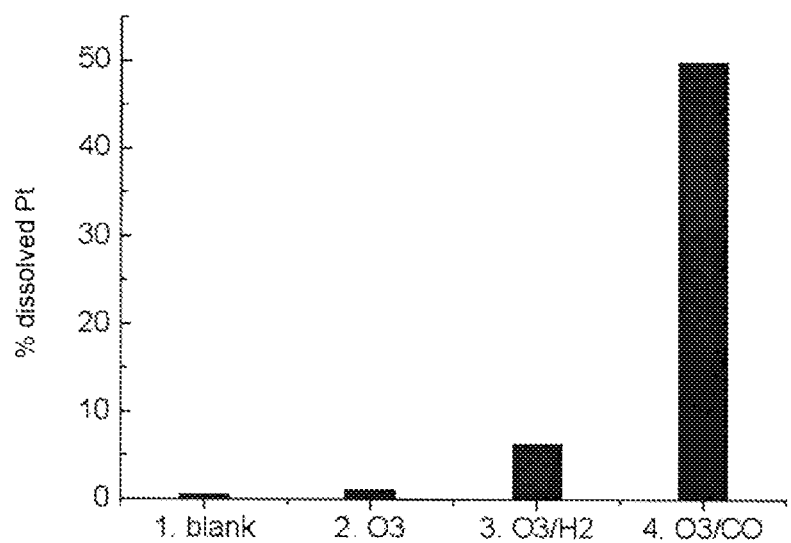
FIG. 1 shows the results of the experiments (i) to (iv) of Example 1 in graph form.

The results of the experiments (i) to (iv) are shown in graph form in FIG. 1.

Example 2

Pt particles having a particle size of 3 nm on activated carbon having a large surface area (loading with metal 46%) (obtainable from Tanaka Kikinzoku Intern, Japan) were suspended in a concentration of 0.1 mg/ml in 200 ml of 0.1 M $HClO_4$ and 10 µl of 1 M NaCl as per example 1 in a glass beaker containing a magnetic stirrer bar. The solution was stirred using a magnetic stirrer during the process. The glass beaker had two inlets for gases.

Procedure:

20 min $O_3$, 10 min Ar, 10 min CO, 10 min Ar, 10 min $O_3$, 5 min Ar, 10 min CO, 10 min Ar, 10 min $O_3$, 5 min Ar . . . .

Figure 2:
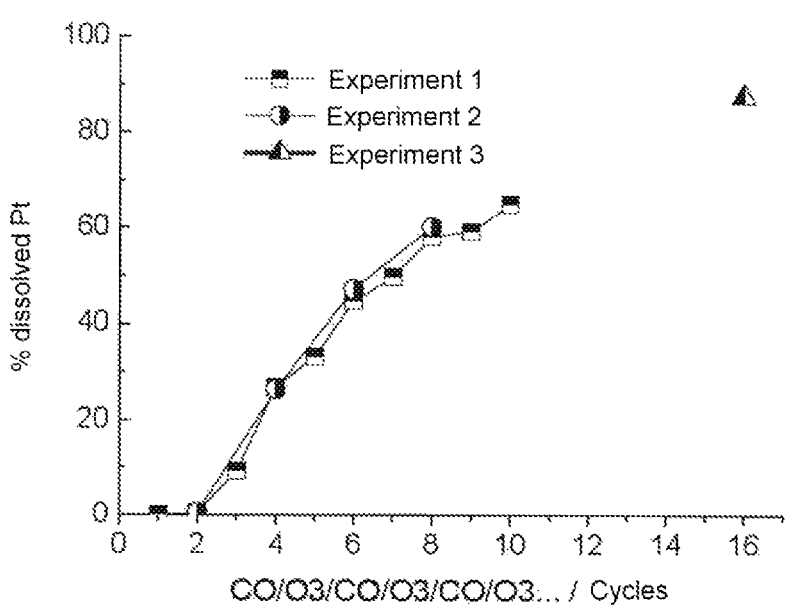
FIG. 2 shows the results of Example 2 as a graph.

The results are shown in FIG. 2.

Example 3

In a glass breaker containing 200 ml of 0.1 M HCl, nanoparticles comprising Pt and Pd which were embedded in the washcoat on Si—Al-based honeycomb ceramic were suspended and filtered through a 200 nm filter. The glass beaker had two inlets for gases. The process was carried out with stirring.

Procedure:

CO 20 min+Ar 5 min+$O_3$ 20 min+Ar 5 min+CO 20 min+Ar 5 min+$O_3$ 20 min+5 min Ar . . . .

The results are shown in the following table.

|   | Reaction with | % of Pt (dissolved) |
|---|---|---|
| 1 |   | 0.001 |
| 2 | Sample | 0.004 |
| 3 | 1 cycle | 3.113 |
| 5 | 6 cycles | 6.980 |
| 6 | 12 cycles | 24.211 |
| 7 | 19 cycles | 42.594 |

Figure 3:
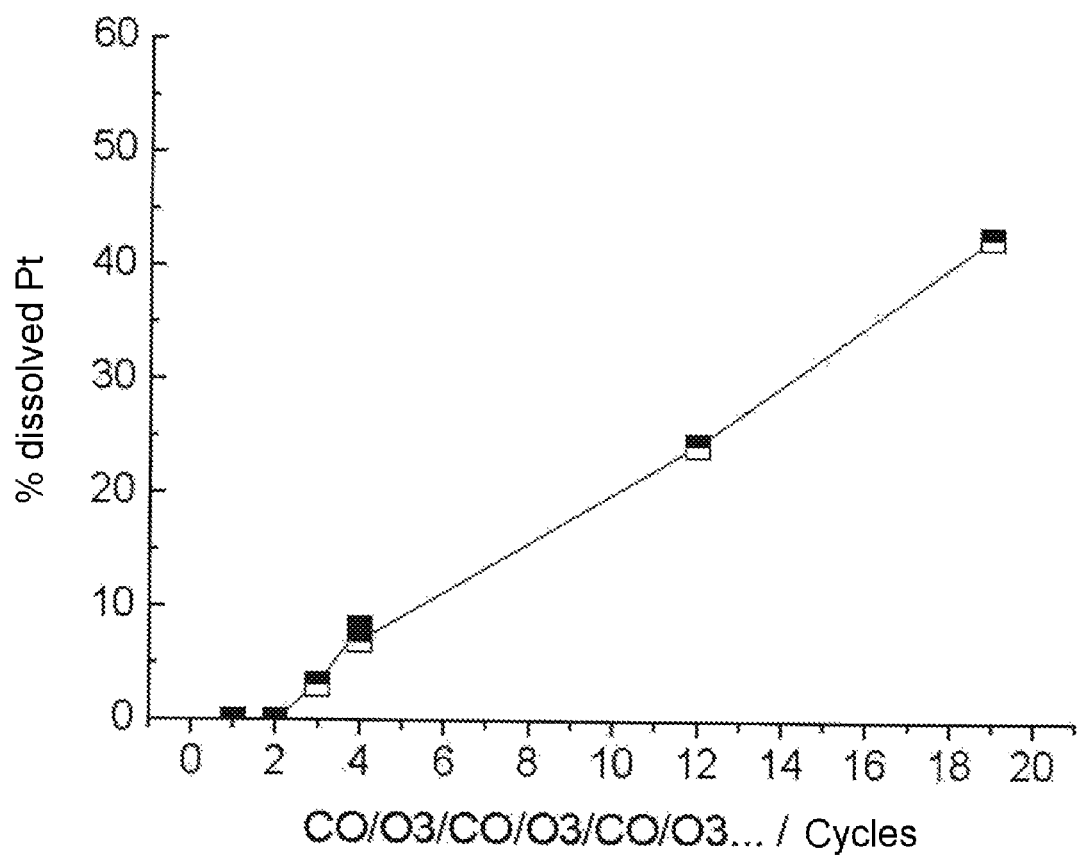
FIG. 3 shows the results of Example 3 as a graph.

The results are shown in graph form in FIG. 3.

As the experimental results show, the Pt concentration increases linearly with the number of cycles (in each case reaction with ozone and CO). This means that a recovery of the noble metal of almost up to 100% is ultimately possible.

What is claimed is:

1. A process for isolating noble metal from noble metal-containing materials, the process comprising the steps
    A) contacting of the noble metal-containing materials with an oxidizing agent and subsequently flushing with an inert gas to remove the oxidizing agent,
    B) contacting of the noble metal-containing material with a reducing agent and subsequently flushing with an inert gas to remove the reducing agent,
        wherein the steps A) and B) represent a reaction cycle which is carried out in aqueous solution;
    C) repeating the reaction cycle until a content of noble metal in the aqueous solution no longer increases.

2. The process as claimed in claim 1, characterized in that the noble metal is selected from the group consisting of Pt, Pd, Rh, Au, Ru, Ir, Os and Ag.

3. The process as claimed in claim 1, characterized in that the reaction cycle is carried out at a pH of ≤3 or ≥10.

4. The process as claimed in claim 3, characterized in that the pH is set by an acid selected from among HCl, $HClO_4$, $H_2SO_4$, $HNO_3$, aqua regia and any mixtures of the above, or an alkali metal hydroxide.

5. The process as claimed in claim 1, characterized in that at least one of the steps A) and B) is carried out in the presence of a complexing agent.

6. The process as claimed in claim 5, characterized in that the complexing agent is selected from among NaCl, KCl, NaBr, KBr, NaI, KI, NaCN, NaOCN, NaSCN, KCN, KOCN and/or KSCN.

7. The process as claimed in claim 1, characterized in that the oxidizing agent is selected from among $O_2$, $O_3$ (ozone), $H_2O_2$, $HClO_4$ or salts thereof, $HClO_3$ or salts thereof, alkali metal permanganate, alkali metal percarbonates, alkali metal persulfates and any mixtures of the above.

8. The process as claimed in claim 1, characterized in that the reducing agent is selected from among $H_2S$, $SO_2$, $SO_3$, CO, $H_2$, methanol, ethanol and any mixtures thereof.

9. The process as claimed in claim 1, characterized in that the noble metal is isolated from the reaction solution by mechanical or electrochemical methods.

\* \* \* \* \*